(12) United States Patent
Nishiyama et al.

(10) Patent No.: US 9,838,551 B2
(45) Date of Patent: Dec. 5, 2017

(54) IMAGE TRANSMITTING APPARATUS (75) Inventors: Haruo Nishiyama, Osaka (JP); Takeshi Nakamura, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 836 days.

(21) Appl. No.: 12/533,566

(22) Filed: Jul. 31, 2009

(65) Prior Publication Data

US 2010/0027068 A1   Feb. 4, 2010

(30) Foreign Application Priority Data

Jul. 31, 2008 (JP) ................................ 2008-197190

(51) Int. Cl.
    H04N 1/00           (2006.01)
(52) U.S. Cl.
    CPC ..... H04N 1/00222 (2013.01); H04N 1/00413 (2013.01); *H04N 2201/3207* (2013.01); *H04N 2201/3222* (2013.01); *H04N 2201/3232* (2013.01); *H04N 2201/3242* (2013.01); *H04N 2201/3243* (2013.01)
(58) Field of Classification Search
    CPC ........... H04N 1/00222; H04N 1/00413; H04N 2201/3207; H04N 2201/3222; H04N 2201/3232; H04N 2201/3242; H04N 2201/3243
    USPC ................................ 358/1.15, 442, 400, 3.28
    See application file for complete search history.

(56) References Cited

U.S. PATENT DOCUMENTS

| 2004/0258277 A1* | 12/2004 | Ueda ............................ 382/100 |
| 2006/0047964 A1* | 3/2006 | Murata ......................... 713/176 |
| 2006/0126096 A1* | 6/2006 | Yasukaga .............. G06F 17/243 358/1.14 |
| 2007/0130464 A1* | 6/2007 | Swedor et al. ............... 713/170 |
| 2007/0214223 A1* | 9/2007 | Morikubo ..................... 709/206 |
| 2007/0247667 A1* | 10/2007 | Mori ........................... 358/1.18 |
| 2008/0117469 A1* | 5/2008 | Ueda et al. ................... 358/3.28 |
| 2008/0117476 A1* | 5/2008 | Okamoto et al. ............. 358/442 |
| 2009/0046329 A1* | 2/2009 | Tsuda ........................... 358/474 |

FOREIGN PATENT DOCUMENTS

| JP | 04-248753 | 9/1992 |
| JP | 11-234458 | 8/1999 |
| JP | 2001-119545 | 4/2001 |
| JP | 2002-077600 | 3/2002 |
| JP | 2003-274133 | 9/2003 |
| JP | 2006-013627 | 1/2006 |
| JP | 2006-129312 | 5/2006 |
| JP | 2007-166201 | 6/2007 |

* cited by examiner

*Primary Examiner* — Moustapha Diaby (74) *Attorney, Agent, or Firm* — Keating & Bennett, LLP (57) ABSTRACT An image transmitting apparatus is provided that automatically displays an address before transmission if a user gives an instruction for adding a mark such as "CONFIDENTIAL" or "IMPORTANT". The image transmitting apparatus of the present invention is the image transmitting apparatus transmits image data to a specified address includes an image adding portion that adds a predetermined specific image to the image data in accordance with a user's operation, wherein displays a specified address of image data before transmitting the image data to which it is indicated to add the specific image and transmits the image data with the specific image added in accordance with a user's confirming operation.

4 Claims, 7 Drawing Sheets

IMAGE TRANSMITTING APPARATUS

CROSS-NOTING PARAGRAPH

This non-provisional application claims priority under 35 U.S.C. §119 (a) on Patent Application No. 2008-197190 filed in JAPAN on Jul. 31, 2008, the entire contents of which are hereby incorporated herein by reference.

FIELD OF THE INVENTION

The present invention relates to an image transmitting apparatus that transmits image data to a specified address and more particularly to an image transmitting apparatus that automatically displays the specified address before transmitting image data related to a confidential document.

BACKGROUND OF THE INVENTION

Conventionally, an image transmitting apparatus such as a facsimile apparatus has been proposed that includes an address confirming function of displaying a specified address to confirm whether the address is correct before transmission to prevent incorrect transmission (see Japanese Laid-Open Patent Publication No. 11-234458).

Because the people are getting more concerned about the information crisis management in recent years, for example, an image forming apparatus has been proposed that automatically prints a mark such as "CONFIDENTIAL" or "IMPORTANT" in a margin area of the print to indicate that the print is a confidential document to prevent the leak of a confidential document when the confidential document is copied in accordance with an instruction from a user (see Japanese Laid-Open Patent Publication No. 2003-274133).

If a user frequently uses facsimile transmission, the address confirming function may be turned off because it is cumbersome to confirm the addresses with the address confirming function before transmission.

As a result, the user performs the facsimile transmission without confirming whether the specified addresses are correct, and if a confidential document is incorrectly transmitted, the confidential document is leaked to the outside.

If a confidential document is leaked in this way, it is no use automatically setting a mark such as "CONFIDENTIAL" or "IMPORTANT" in a margin area of image data to indicate that the image data (transmission data) is a confidential document and transmitting the image data through the use of the technical means disclosed in Japanese Laid-Open Patent Publication No. 2003-274133 from the aspect of information management.

SUMMARY OF THE INVENTION

It is the object of the present invention to provide an image transmitting apparatus that includes a function of adding a mark such as "CONFIDENTIAL" or "IMPORTANT" to image data to indicate that the image data is a confidential document and that automatically displays the address before transmission if a user gives an instruction for adding the mark to image data.

Another object of the present invention is to provide an image transmitting apparatus transmitting image data to a specified address, wherein an image adding portion that adds a predetermined specific image to the image data in accordance with a user's operation is provided, and the image transmitting apparatus displays a specified address of image data before transmitting the image data to which it is indicated to add the specific image, and transmits the image data with the specific image added in accordance with a user's confirming operation.

Another object of the present invention is to provide the image transmitting apparatus, wherein the image data or the image data with the specific image added is displayed as a preview along with the display of the address.

Another object of the present invention is to provide the image transmitting apparatus, wherein the specific image is a text image such as "CONFIDENTIAL", "SECRET", or "IMPORTANT".

Another object of the present invention is to provide the image transmitting apparatus, wherein the transmission of the image data is performed through facsimile communication or e-mail.

PREFERRED EMBODIMENTS OF THE INVENTION

A schematic of the present invention will be described with reference to operation screens displayed on a display panel of an image transmitting apparatus according to the present invention, as shown in FIGS. 1 to 5.

The image transmitting apparatus according to the present invention automatically displays the address before transmission when image data is transmitted with a stamp such as "CONFIDENTIAL" or "IMPORTANT" added in accordance with a user's instruction.

(Setting of Transmission Conditions)

An operation of a user setting various transmission conditions will first be described.

Figure 1:
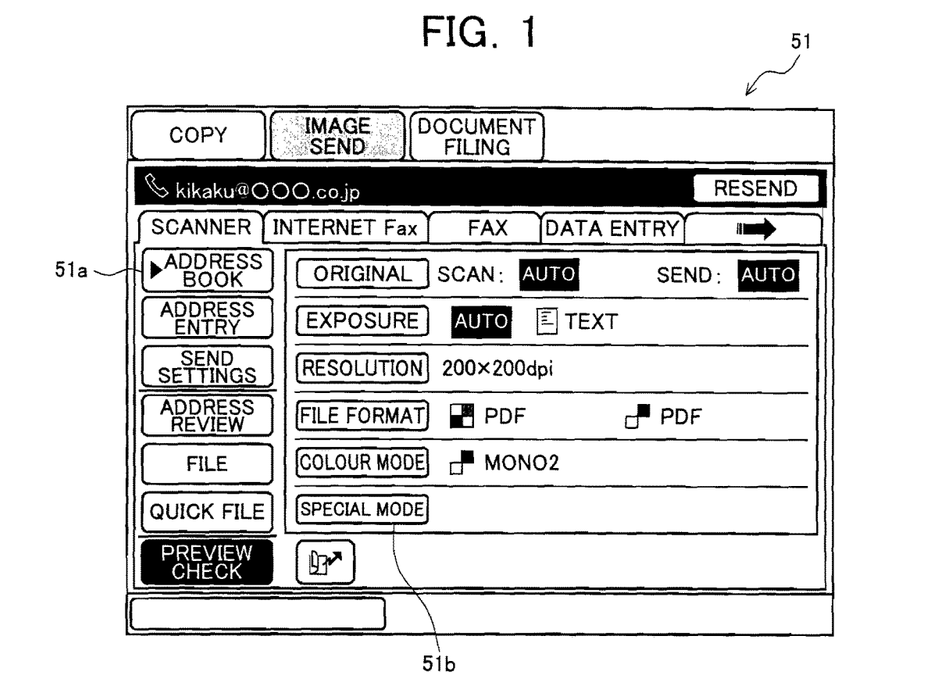
FIG. 1 is a diagram of an operation screen.

When a user sets a document for transmission on an auto document feeder (ADF) of the image transmitting apparatus and operates a send key (described later) on an operation panel, an operation screen 51 of FIG. 1 is displayed on the display panel.

It is assumed that the document for transmission is a document with a higher necessity of confidentiality.

Figure 2:
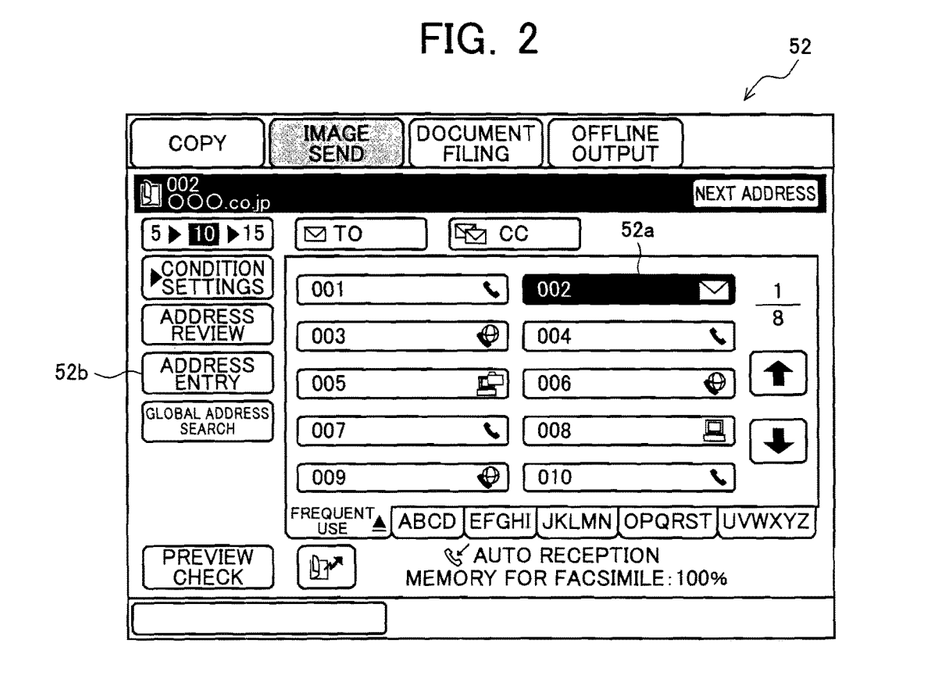
FIG. 2 is a diagram of an address book screen.

When the user operates an address book button 51a on the operation screen 51 to specify an address, an address book screen 52 of FIG. 2 is displayed. Reference numeral 51b of FIG. 1 denotes a special mode button for displaying a setting screen to add a stamp such as "CONFIDENTIAL" or "IMPORTANT" to image data to indicate that the document has a higher necessity of confidentiality.

When an address button 52a on the address book screen 52 is operated to specify an address, the screen returns to the operation screen of FIG. 1. An address entry button 52b may be operated to directly enter the address like xxx@hogehoge.foo.

Figure 3:
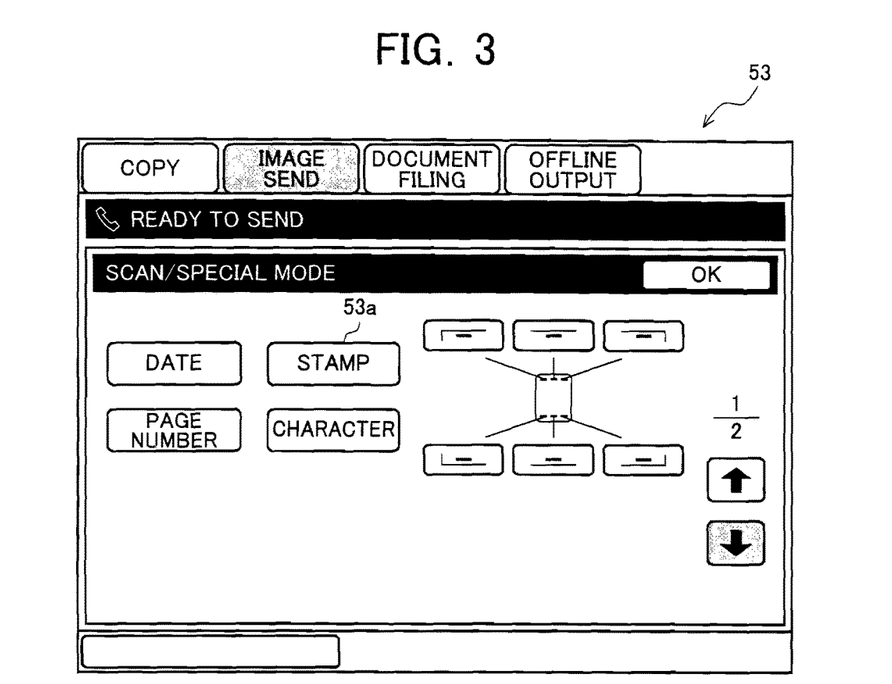
FIG. 3 is a diagram of a special mode screen.

When the user operates the special mode button 51b on the operation screen 51 to add a stamp such as "CONFIDENTIAL" or "IMPORTANT" to image data to indicate that the document has a higher necessity of confidentiality, a special mode screen 53 of FIG. 3 is displayed on the display panel.

Figure 4:
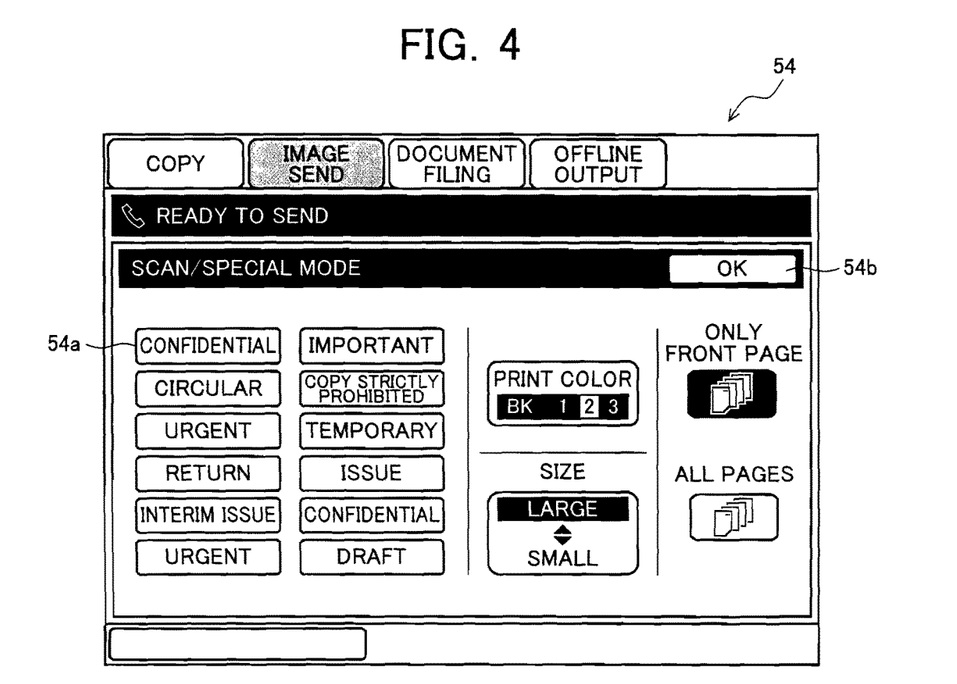
FIG. 4 is a diagram of a stamp selection screen.

When the user operates a stamp button 53a on the special mode screen 53, a stamp selection screen 54 of FIG. 4 is displayed to select the stamp such as "CONFIDENTIAL" or "IMPORTANT".

When the user operates a "CONFIDENTIAL" button 54a on the stamp selection screen 54, characters of "CONFIDENTIAL" are set in a predetermined area of the image data, for example, a blank area on the upper left corner of a paper sheet.

The user also sets the transmission conditions such as resolution and a color mode through the operation screens, operation keys, etc.

(Display of Address Confirming Screen)

The processing of displaying an address confirming screen after the setting of the above transmission conditions will be described.

After the setting of the transmission conditions, for example, if the user operates an OK button 54b on the stamp selection screen 54 of FIG. 4 and a start key (described later), the image transmitting apparatus scans (reads) a document set on the ADF to generate image data (transmission data).

Figure 5:
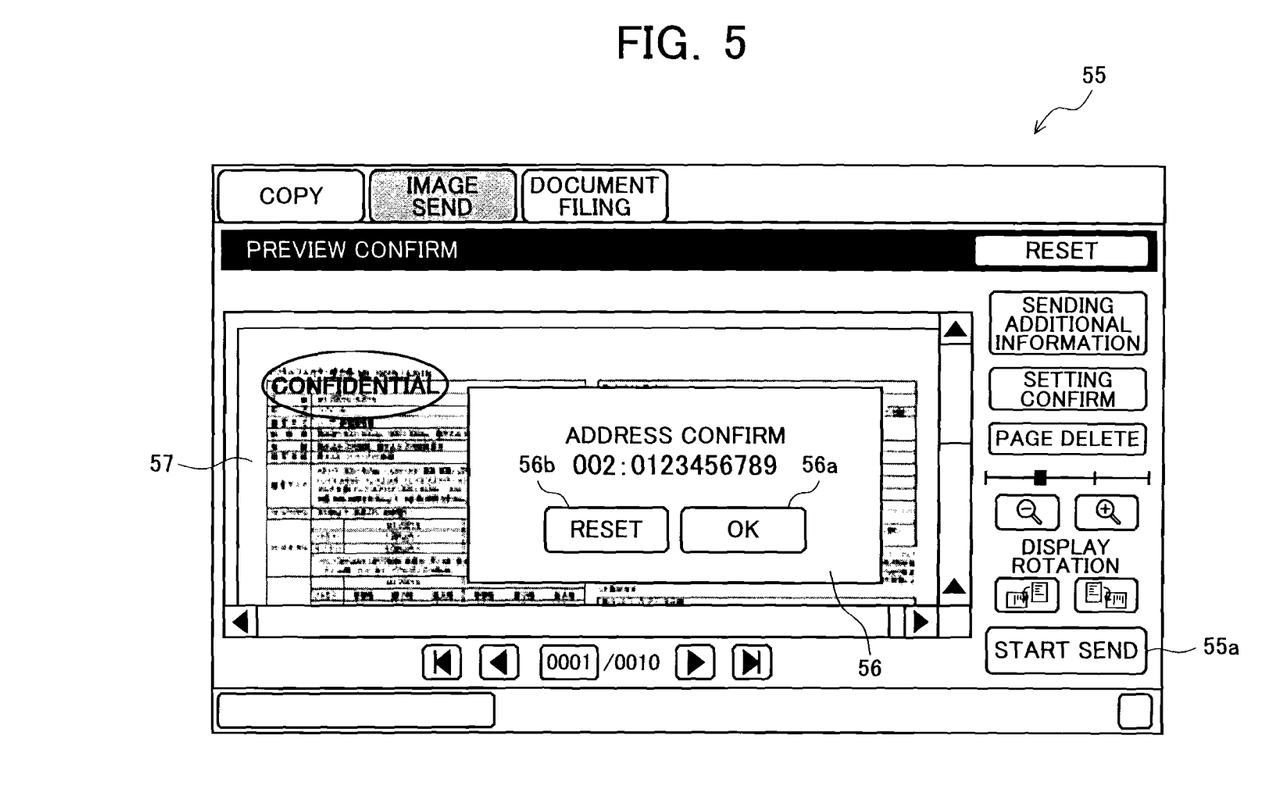
FIG. 5 is a diagram of an address confirmation screen.

An address confirming screen 55 is then automatically displayed on the display panel. Reference numeral 56 denotes an address confirming dialog displaying the specified address and Reference numeral 57 denotes a preview display screen displaying a scanned document (image).

When the user confirms the address, operates an OK button 56a on the address confirming dialog 56, and operates a start send button 55a, the image data with the "CONFIDENTIAL" stamp added is transmitted to the specified address.

When the user operates a reset button 56b on the address confirming dialog 56, the operation screen 51 of FIG. 1 is displayed to allow the user to re-specify the correct address.

As a result, if a mark is set in image data to indicate that the image data is a confidential document, an address may be confirmed before transmission and, therefore, the incorrect transmission may be prevented.

Since the image data may be displayed for preview in addition to the address confirmation, the convenience of the user is enhanced by enabling the confirmation of whether the document for transmission is correctly read or whether a type of the set stamp is the desired type.

Figure 6:
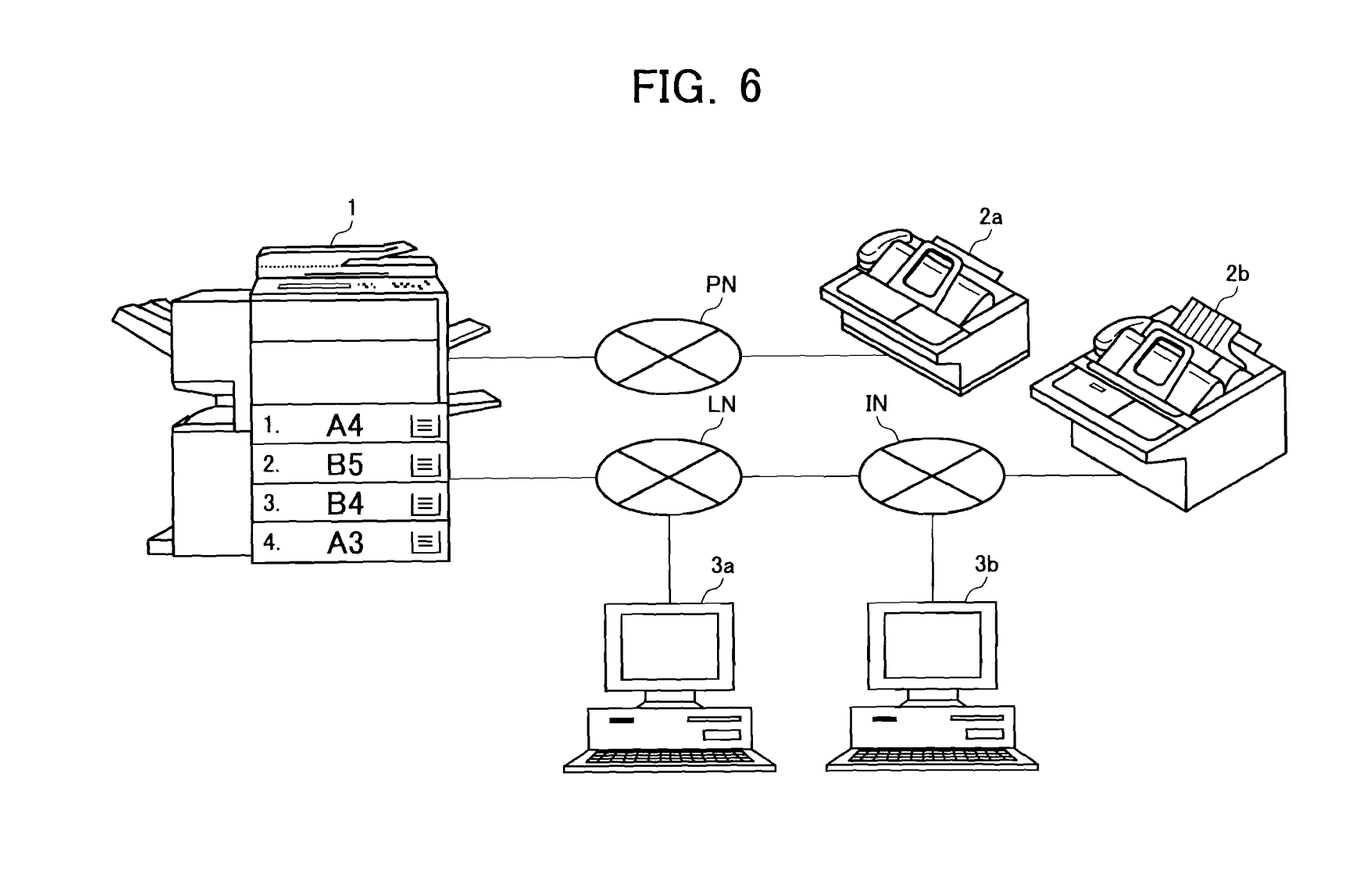
FIG. 6 is a diagram of an image transmitting apparatus according to the present invention connected through a network to external apparatuses.

FIG. 6 depicts an image transmitting apparatus 1 according to the present invention connected through a network to external apparatuses.

For example, the image transmitting apparatus 1 is connected to a facsimile apparatus 2a through a public switched telephone network PN, to a PC 3a through a local network LN, and to a facsimile apparatus 2b and a PC 3b through the internet IN. The image transmitting apparatus 1 is assumed to be a multi-function peripheral (MFP) in this embodiment.

The image transmitting apparatus 1 is capable of transmitting image data to the facsimile apparatuses (2a, 2b) and the PCs (3a, 3b) and receiving data from the facsimile apparatuses, etc.

Figure 7:
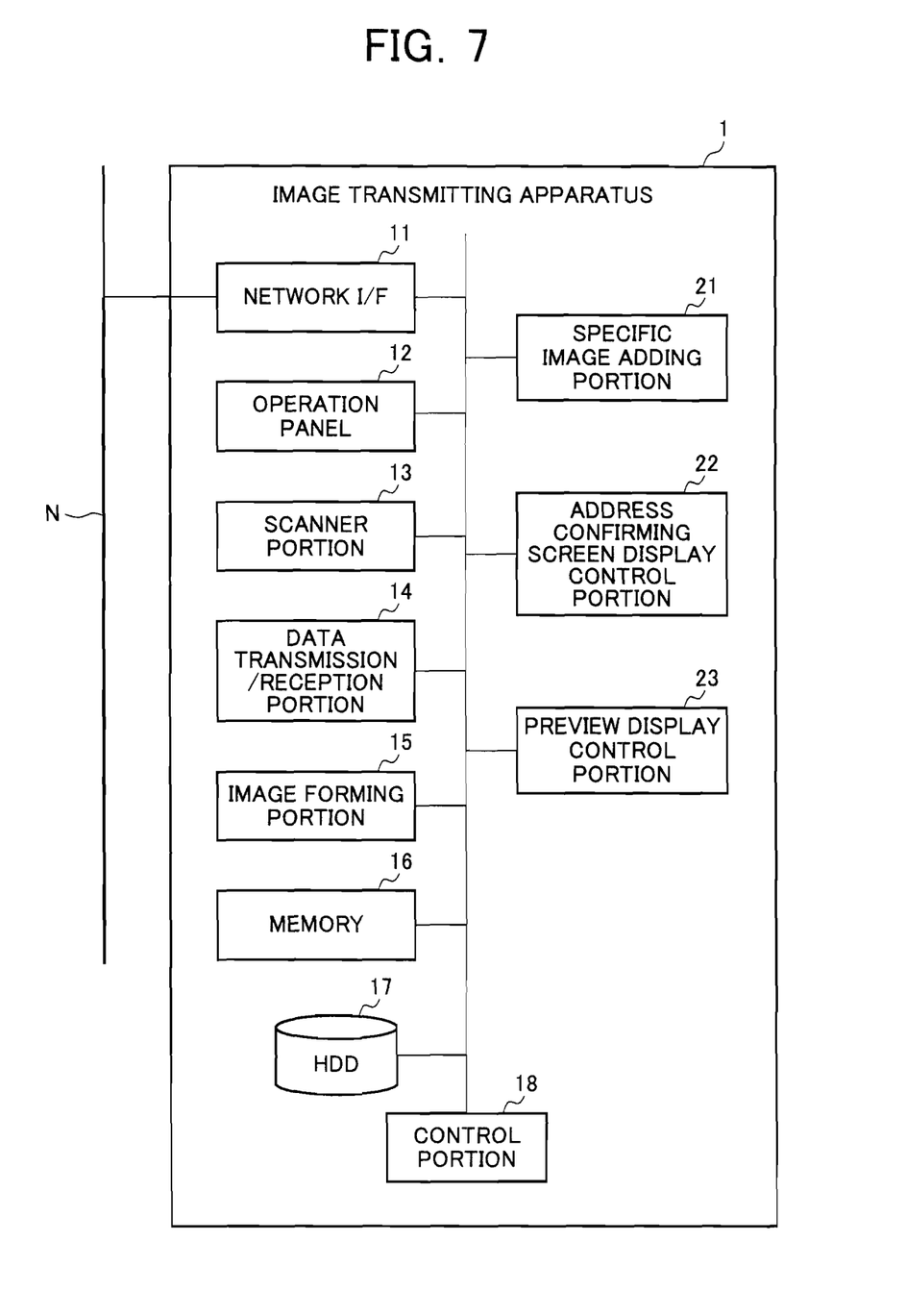
FIG. 7 is a functional block diagram of the image transmitting apparatus according to the present invention.

FIG. 7 is a functional block diagram of the image transmitting apparatus 1 according to the present invention.

Reference numeral 11 denotes a network I/F which provides an interface function for a network N to perform data transmission/reception to/from a facsimile apparatus 2, a PC 3, etc., connected to the network N.

Figure 8:
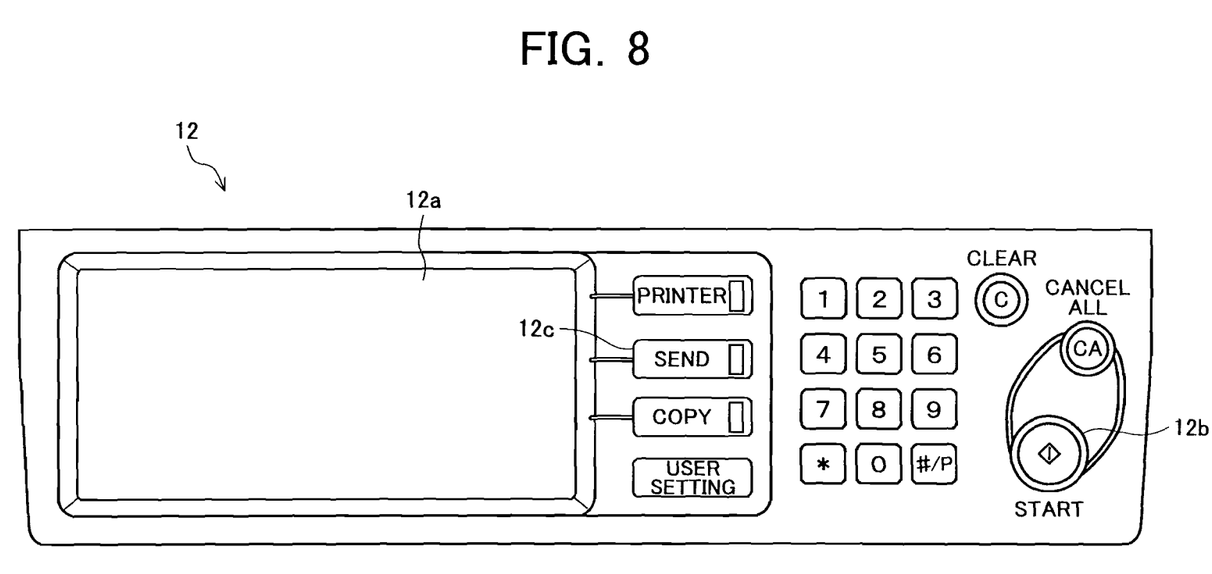
FIG. 8 is a diagram of an exterior appearance of an operation panel.

Reference numeral 12 denotes an operation panel for operating the image transmitting apparatus 1 and the operation panel is composed of a display panel, a ten key, etc. FIG. 8 is a diagram of an exterior appearance of an operation panel 12.

Reference numeral 12a denotes a display panel that displays the address confirming screen 55 of FIG. 5; Reference numeral 12b denotes a start key for starting scan/starting transmission; and Reference numeral 12c denotes an image send key for displaying the operation screen 51 for the image send of FIG. 1, for example.

Reference numeral 13 of FIG. 7 denotes a scanner portion including ADF, etc., to scan a document to generate image data to be transmitted.

Reference numeral 14 is a data transmission/reception portion that has a facsimile communication function and an e-mail function. For example, if image data, etc., generated by the scanner portion 13 is transmitted to an address specified by the facsimile function, the image data is processed in a predetermined processing such as compression before transmission.

If the image data is transmitted to a specified address by the e-mail function, the image data is converted into, for example, a TIFF (Tag Image File Format) file and the TIFF file is attached to a multipart mail in accordance with MIME (Multipurpose Internet Mail Extension), for example. The mail is then transmitted to the specified address.

Reference numeral 15 denotes an image forming portion that has an image forming function (printing function) and the image forming portion is comprised of a photoreceptor drum, a developing device, a cleaning unit, etc.

Reference numeral 16 denotes a memory that stores OSD data such as operation screens displayed on the display panel 12a, an address book, and various pieces of control information, and Reference numeral 17 denotes an HDD for recording image data generated by the scanner portion 13 and image data transmitted by the facsimile apparatuses 2, the PCs 3, etc.

Reference numeral 18 denotes a control portion that controls the functional blocks and the control portion executes the display control for the operation screens, etc.

Reference numeral 21 denotes a specific image adding portion that adds a predetermined specific image (stamp) to image data to be transmitted in accordance with the user's operation. The specific image refers to, for example, a text image such as "CONFIDENTIAL", "SECRET", or "IMPORTANT".

The above adding processing may be performed with the use of various methods conventionally proposed, for example, the method disclosed in Japanese Laid-Open Patent Publication No. 2003-274133.

Upon receipt of an instruction for adding the specific image to image data through the stamp selection screen 54 of FIG. 4 from a user, the specific image adding portion 21 turns on a confirming screen display flag stored in the memory 16.

Reference numeral 22 denotes an address confirming screen display control portion and, if a user gives an instruction for adding the specific image (the confirming screen display flag is turned on), the address confirming screen display control portion controls the processing of displaying a confirming screen (dialog) of FIG. 5 for confirming the address specified by the user, for example.

Reference numeral 23 denotes a preview display control portion that displays a document image read by the scanner portion 13 (image data generated by the scanner portion 13) on the display panel 12a of the operation panel 12, for example, as shown in FIG. 5, along with the display of the confirming screen.

The image data to be displayed may be the image data with the specific image added or may be the image data without the specific image.

Before transmitting the image data to which it is indicated to add the specific image to image data through the user's operation, the address confirming screen display control portion 22 automatically displays the address confirming screen 55 (the address confirming dialog 56) that confirms the specified address of the image data. The preview display control portion 23 may automatically display a preview of the image data on the display panel 12a together with the display of the address confirming screen.

After the user confirms the address, operates the OK button 56a on the address confirming dialog 56, and operates the start send button 55a on the address confirming screen 55, i.e., after the user's confirming operation, the data transmission/reception portion 14 transmits the image data with the specific image added to the specified address.

Figure 9:
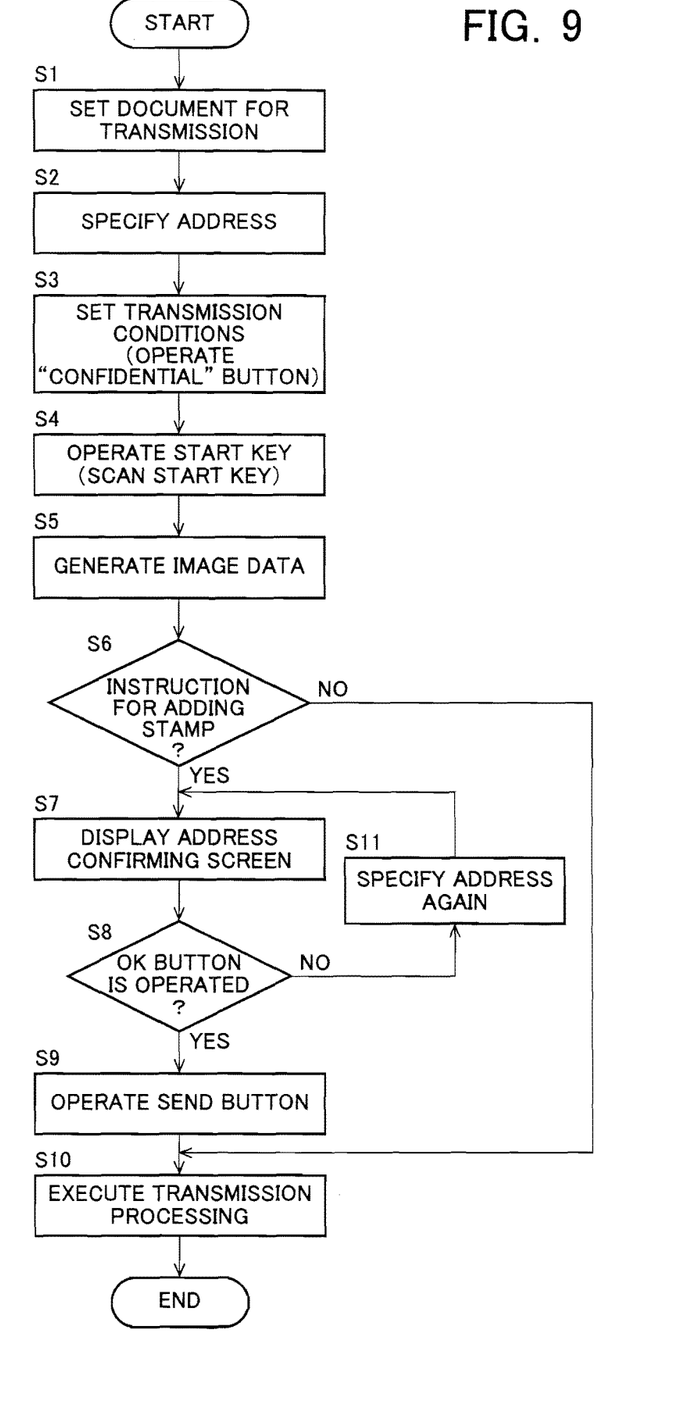
FIG. 9 is an explanatory flowchart of address confirming screen display.

FIG. 9 is an explanatory flowchart of the address confirming screen display.

For example, a user sets a document for transmission on the ADF of the image transmitting apparatus 1 (step S1) and operates the address button 52a on the address book screen 52 shown in FIG. 2, for example, to specify an address (step S2). The user sets the transmission conditions and operates the "CONFIDENTIAL" button 54a on the stamp selection screen 54 shown in FIG. 4, for example (step S3).

When the user operates the start key 12b on the operation panel 12 (step S4), the scanner portion 13 reads the document set on the ADF to generate image data corresponding to the document (step S5). The generated image data is processed in various image processings and recorded in the HDD 16.

The address confirming screen display control portion 22 determines whether an instruction is issued to add a stamp such as "CONFIDENTIAL" to the image data (step S6). The determination is made by checking whether the confirming screen display flag is turned on as above.

If the instruction is issued (step S6/YES), the address confirming screen display control portion 22 automatically displays the address confirming screen 55 (the address confirming dialog 56) on the display panel 12a of the operation panel 12 as shown in FIG. 5 (step S7). At the time of the display, the preview display control portion 23 may display a preview of the transmission image data.

After confirming the address displayed on the address confirming dialog 56, when the user operates the OK button 56a on the dialog 56 (step S8/YES) and operates the start send button 55a on the address confirming screen 55 (step S9), the specific image adding portion 21 adds a text image such as "CONFIDENTIAL" to the image data recorded on the HDD 16 and outputs to the data transmission/reception portion 14 the image data with the text image added. The data transmission/reception portion 14 receives the image data and transmits to the specified address the image data with the "CONFIDENTIAL" stamp added (step S10).

If the user determines that the specified address is incorrect, the user operates the reset button 56b of the address confirming dialog 56 (step S8/NO) to specify the address again (step S11).

If it is determined at step S6 that the instruction for adding a stamp such as "CONFIDENTIAL" to the image data is not received through the stamp selection screen 54 from the user (step S6/NO), the data transmission/reception portion 14 transmits the image data generated by the scanner portion 13 to the specified address (step S10).

When the preview of the transmission image data is displayed along with the address confirming dialog 56 at step S7, if the user determines that, for example, a type of the set stamp is not the desired one, the process goes to step S3 and a type of the stamp may be reset.

The stamp such as "CONFIDENTIAL" may be added not only to image data generated by the scanner but also image data from the PC 3 to transmit the image data to the specified address. In this case, the image data received from the PC 3 is selected at step S1 of the flowchart FIG. 9. The processing after step S2 is subsequently executed except step 5.

According to the present invention, the following effect may be acquired.

If the image transmitting apparatus adds a mark to indicate that the image data is a confidential document according to the present invention, the specified address is automatically displayed before transmission and, therefore, the confidential document may be prevented from being leaked to the outside due to incorrect transmission.

The invention claimed is:

1. An image transmitting apparatus transmitting image data to a specified address, comprising:
   an image adding portion configured to add a specific image to the image data in accordance with user operation,
   a control portion configured to automatically display the specified address before transmitting the image data when the specific image is added to the image data by a user, and transmit the image data including the specific image added once the specified address is confirmed by the user, and when the specific image is not added to the image data by a user, transmit the image data without adding the specific image to the specified address and without requiring a confirmation of the specified address.

2. The image transmitting apparatus as defined in claim 1, wherein the image data or the image data including the specific image added is displayed as a preview along with the display of the address.

3. The image transmitting apparatus as defined in claim 1 or 2, wherein the specific image is a text image consisting of at least one of "CONFIDENTIAL", "SECRET", or "IMPORTANT".

4. The image transmitting apparatus as defined in claim 1 or 2, wherein the transmission of the image data is performed through facsimile communication or e-mail.

* * * * *